United States Patent
Kang

(10) Patent No.: US 9,652,177 B2
(45) Date of Patent: May 16, 2017

(54) MEMORY CONTROLLER INCLUDING HOST COMMAND QUEUE AND METHOD OF OPERATING THE SAME

(71) Applicant: SK hynix Inc., Gyeonggi-do (KR)

(72) Inventor: Ji Yeun Kang, Gyeonggi-do (KR)

(73) Assignee: SK Hynix Inc., Gyeonggi-do (KR)

( * ) Notice: Subject to any disclaimer, the term of this patent is extended or adjusted under 35 U.S.C. 154(b) by 20 days.

(21) Appl. No.: 14/835,442

(22) Filed: Aug. 25, 2015

(65) Prior Publication Data

US 2016/0291878 A1 Oct. 6, 2016

(30) Foreign Application Priority Data

Apr. 3, 2015 (KR) .......................... 10-2015-0047633

(51) Int. Cl.
*G06F 3/06* (2006.01)
(52) U.S. Cl.
CPC ............ *G06F 3/0659* (2013.01); *G06F 3/061* (2013.01); *G06F 3/0656* (2013.01); *G06F 3/0679* (2013.01)
(58) Field of Classification Search
CPC ...... G06F 3/068; G06F 3/0634; G06F 3/0659; G06F 3/067; G06F 3/0679; G06F 3/0656; G06F 3/061
See application file for complete search history.

(56) References Cited

U.S. PATENT DOCUMENTS

| | | | |
|---|---|---|---|
| 6,128,674 A | 10/2000 | Beukema et al. | |
| 2004/0044857 A1* | 3/2004 | Jeddeloh | G06F 13/1673 711/154 |
| 2009/0282188 A1* | 11/2009 | Son | G06F 12/0246 711/103 |
| 2012/0278530 A1* | 11/2012 | Ebsen | G06F 3/0659 711/103 |
| 2015/0074294 A1* | 3/2015 | Shacham | G06F 13/4243 710/5 |
| 2015/0199137 A1* | 7/2015 | Shin | G06F 3/0611 711/103 |
| 2016/0011966 A1* | 1/2016 | Keeler | G06F 12/0246 711/103 |

FOREIGN PATENT DOCUMENTS

KR 1020110112420 10/2011

OTHER PUBLICATIONS

Jedec Standard, Universal Flash Storage (UFS 1.1), JESD220A, Jun. 2012.*

* cited by examiner

*Primary Examiner* — Rocio Del Mar Perez-Velez
(74) *Attorney, Agent, or Firm* — IP & T Group LLP

(57) ABSTRACT

Disclosed is a memory controller, including: a host interface suitable for queuing a plurality of host commands from a host in a host command queue; a state register storing ready set bits respectively corresponding to the plurality of host commands; a memory command generating unit generating and queuing memory commands and state update information corresponding to the queued host commands in a memory command queue, respectively; and the memory command performing unit performing an operation in response to the queued memory commands. The memory command performing unit obtains state update information corresponding to the performed memory command from the memory command queue, and updates a ready set bit of a host command corresponding to the performed memory command based on the obtained state update information.

12 Claims, 5 Drawing Sheets

MEMORY CONTROLLER INCLUDING HOST COMMAND QUEUE AND METHOD OF OPERATING THE SAME

CROSS-REFERENCE TO RELATED APPLICATION

The present application claims priority to Korean patent application number 10-2015-0047633, filed on Apr. 3, 2015, In the Korean Intellectual Property Office, the entire disclosure of which is herein incorporated by reference in its entirety.

BACKGROUND

1. Field

The present invention relates to an electronic device, and more particularly, to a memory controller including a host command queue and a method of operating the same, 2. Discussion of Related Art Semiconductor memory devices use semiconductors such as silicon (Si), germanium (Ge), gallium arsenide (GaAs), and indium phosphide (InP). Semiconductor memory devices are generally classified into volatile memory devices and nonvolatile memory devices.

Volatile memory devices are unable to maintain stored data without a constant source of power. Examples of volatile memory devices include Static RAM (SRAM), Dynamic RAM (DRAM), Synchronous DRAM (SDRAM), and the like. Nonvolatile memory devices can maintain their stored data even without a constant source of power. Nonvolatile memory devices include Read Only Memory (ROM), Programmable ROM (PROM), Electrically Programmable ROM (EPROM), Electrically Erasable and Programmable ROM (EEPROM), flash memory, Phase-change RAM (PRAM), Magnetic RAM (MRAM), Resistive RAM (RRAM), Ferroelectric RAM (FRAM), and the like. Flash memory is generally divided into NOR and NAND types.

A memory controller generates a memory command in response to a host command, and controls the semiconductor memory device to perform the generated memory command. The memory controller includes a host command queue for queueing the host commands. The host command queue may consist of RAM within the memory controller.

SUMMARY

The present invention has been made in an effort to provide a memory controller having improved operation speed and a method of operating the same.

An exemplary embodiment of the present invention provides a memory controller, including: a host command queue; a host interface suitable for queueing a plurality of host commands from a host in the host command queue; a state register suitable for storing ready set bits respectively corresponding to the plurality of host commands, wherein each of the ready set bits indicates whether a corresponding one of the plurality of host commands is ready and available; a memory command queue; a memory command generating unit suitable for generating and queueing memory commands and state update information in the memory command queue; and the memory command performing unit suitable for performing an operation in response to the queued memory commands. The memory command performing unit may obtain state update information corresponding to the performed memory command from the memory command queue, and updates a ready set bit of a host command corresponding to the performed memory command based on the obtained state update information.

The host interface may output the ready set bits to he host in response to a ready state request from the host.

The memory controller may receive execution commands for part of the plurality of host commands, which is selected by the host.

The host interface may further receive a plurality of task IDs respectively corresponding to the plurality of host commands from the host.

The ready set bits may correspond to the task IDs, respectively.

The memory command generating unit may further queue the task IDs together with the memory command corresponding to the queued host commands in the memory command queue, respectively.

The memory command performing unit may detect a task. ID corresponding to the performed memory command from the memory command queue, and updates a ready set bit corresponding to the detected task ID within the state register according to the obtained state update information.

Another exemplary embodiment of the present invention provides a method of operating a memory controller including: queueing a plurality of host commands from a host in a host command queue; providing ready set bits corresponding to the plurality of host commands, respectively, to a state register; generating and queueing memory commands and state update information in the memory command queue; performing an operation in response to the queued memory commands; updating a ready set bit of a host command corresponding to the performed memory command according to state update information corresponding to the performed memory command; and outputting the ready set bits to the host in response to a ready state request from the host.

Still another exemplary embodiment of the present invention provides a memory controller, including: a host command queue; a host interface suitable for queueing a plurality of host commands and task IDs respectively corresponding to the plurality of host commands from a host in the host command queue; a state register suitable for storing ready set bits respectively corresponding to the task IDs; a memory command queue; a memory command generating unit suitable for generating and queueing memory commands and state update information in the memory command queue; and the memory command performing unit suitable for performing an operation in response to the queued memory commands. The memory command performing unit may obtain state update information corresponding to a performed memory command from the memory command queue, and updates a ready set bit of a host command corresponding to the performed memory command based on the obtained state update information.

According to the exemplary embodiments of the present invention, the memory controller with an improved operation speed and the operating method thereof are provided.

The foregoing summary is illustrative only and is not intended to be in any way limiting. In addition to the illustrative aspects, embodiments, and features described above, further aspects, embodiments, and features will become apparent by reference to the drawings and the following detailed' description.

BRIEF DESCRIPTION OF THE DRAWINGS

The above and other features and advantages of the present invention will become more apparent to those of ordinary skill in the art by describing in detail embodiments thereof with reference to the attached drawings in which:

FIG. 1 is a block diagram illustrating a memory controller according to an exemplary embodiment of the present invention.

DETAILED DESCRIPTION

Hereinafter, an exemplary embodiment of the present invention will be described with reference to the accompanying drawings in detail. In the description below, it should be noted that only what is necessary for understanding an operation according to the present invention will be explained, and explanation on other parts will be omitted to not obscure the main point of the present invention. However, the present invention is not limited to the exemplary embodiments described herein, and may be specified in other forms. The present exemplary embodiments are provided for describing the present invention in detail so that those skilled in the art may easily work the technical spirit of the present invention.

Throughout this specification and the claims that follow, when it is described that an element is "coupled" to another element, the element may be "directly coupled" to the other element or "electrically coupled" to the other element through a third element. Throughout the specification and the claims, unless explicitly state otherwise, the word "comprise" and variations such as "comprises" or "comprising" will be understood to imply the inclusion of stated elements but not the exclusion of any other elements.

Figure 1:
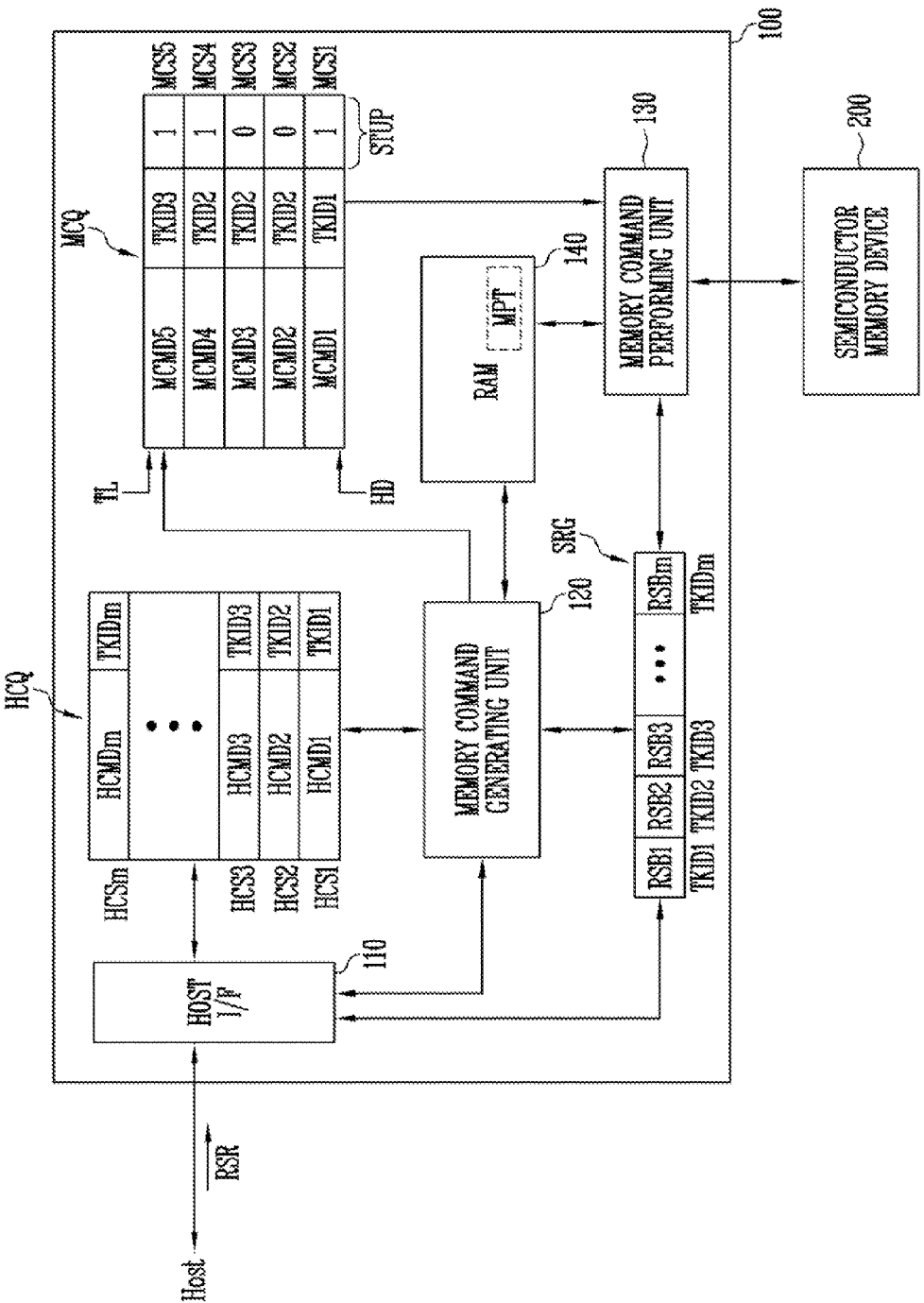

FIG. 1 is a block diagram illustrating a memory controller 100 according to an exemplary embodiment of the present invention.

Referring to FIG. 1, the memory controller 100 may include a host interface 110, a memory command generating unit 120, a memory command performing unit 130, a RAM 140, a host command queue HCQ, a memory command queue MCQ, a state register SRG.

The host interface 110 may communicate with a host Host. The host interface 110 may perform operations under a control of the memory command generating unit 120. The host interface 110 may include a protocol for performing a data exchange between the host Host and the memory controller 100. As an exemplary embodiment, the host interface 110 may communicate with the host Host through one or more of various interface protocols, such as a Universal Serial Bus (USB) protocol, a Multimedia Card (MMC) protocol, a Peripheral Component Interconnection (PCI) protocol, a PCI-express (PCI-E) protocol, an Advanced Technology Attachment (ATA) protocol, a Serial-ATA protocol, a Parallel-ATA protocol, a small computer small interface (SCSI) protocol, an enhanced small disk interface (ESDI) protocol, an Integrated Drive. Electronics (IDE) protocol, and a private protocol.

The host interface 110 may receive a plurality of host commands HCMD1 to HCMDm from the host Host. The host interface 110 may queue the received host commands HCMD1 to HCMDm in the host command queue HCQ. The plurality of host commands HCMD1 to HCMDm may be commands for accessing the semiconductor memory device 200. For example, the host command may be a host read 1) command for reading data stored in the semiconductor memory device 200. For example, the host command may be a host program command for storing data in the semiconductor memory device 200.

The host commands HCMD1 to HCMDm queued in the host command queue HCQ may be maintained until an execution command is received from the host Host. The execution command will be described later.

The host Host may transmit a corresponding logical block address when transmitting each host command. The host interface 110 may store the logical block address in the RAM 140 in relation with a corresponding host command.

In an exemplary embodiment, the host Host may transmit each host command and a task ID together when transmitting each host command. The task ID may be information for identifying each of the host commands HCMD1 to HCMDm. In this case, the host interface 110 may queue a task ID in the host command queue HCQ together with a corresponding host command. In FIG. 1, the first to $m^{th}$ host commands HCMD1 to HCMDm may correspond to first to $m^{th}$ task IDs, respectively. The first host command HCMD1 and the first task ID TKID1 may be included a first host command set HCS1. The second host command HCMD2 and the second task ID TKID2 may be included a second host command set HCS2. The third host command HCMD3 and the third task ID TKID3 may be included a third host command set HCS3. The $m^{th}$ host command HCMDm and the $m^{th}$ task ID TKIDm may be included an $m^{th}$ host command set HCSm. The first to $m^{th}$ host command sets HCS1 to HCSm may be queued in the host command queue HCQ according to a first-in first-out basis.

The state register SRG may store ready set bits RSB1 to RSBm. The ready set bits RSB1 to RSBm may be initialized by the memory is command generating unit 120. The first to $m^{th}$ ready set bits RSB1 to RSBm may have a first setting value (for example, a logical value "0") by the initialization.

In an exemplary embodiment, the first to $m^{th}$ ready set bits RSB1 to RSBm may be included a bit map to correspond to the first to $m^{th}$ task IDs TKID1 to TKIDm, respectively. It may be appreciated that the state register SRG may store the ready set bits having the number larger than m. The state register SRG may store as many ready set bits as available task IDs from the host Host.

The host interface 110 may output the ready set bits RSB1 to RSBm stored in the state register SRG to the host Host in response to a ready state request signal RSR from the host Host. The host Host may determine which of the host commands HCMD1 to HCMDm the memory controller 100 is ready to perform based on the ready set bits RSB1 to RSBm. Accordingly, it is required for the ready set bits RSB1 to RSBm to be updated right after the memory controller 100 is ready to perform the host commands HCMD1 to HCMDm, respectively. The host Host may select some of the first to $m^{th}$ host commands HCMD1 to HCMDm by referring to the ready set bits RSB1 to RSBm, and may transmit an execution command for the selected host commands to the memory system 100. The memory controller 100 may perform the host commands selected from the first to $m^{th}$ host commands HCMD1 to HCMDm in response to the execution command.

The memory command generating unit 120 may control general operations of the memory controller 100. The memory command generating unit 220 may perform the function of a flash translation layer. The memory command generating unit 220 may load a map table MPT to the RAM 140, and may perform the function of the flash translation layer based on the map table MPT.

When the host commands HCMD1 to HCMDm in the host command queue HCQ are queued, the memory command generating unit 120 may generate a memory command for each host command. For a single host command, one or more memory commands may be required. For example, when the host command is a host read command for a specific logical block address, the map table MPT storing mapping information between a physical block address and the logical block address may be required. When the map table MPT does not include mapping information between the logical block address and the physical block address, the memory command generating unit 120 may generate a memory command for reading the corresponding mapping information from the semiconductor memory device 200. For example, in order to obtain the mapping information about the selected logical block address, the memory command generating unit 120 may generate a memory read command for reading one page within the semiconductor memory device 200. In this case, the page may store the mapping information about the selected logical block address. For another example, in order to obtain the mapping information about the selected logical block address, the memory command generating unit 120 may generate a memory read command for reading two or more pages within the semiconductor memory device 200. In this case, two or more pages may store the mapping information about the selected logical block address. In addition, it may be appreciated that the memory command generating unit 120 may generate various memory commands for preparing performance of each host command within the host command queue HCQ.

According to an exemplary embodiment of the present invention, the memory command generating unit 120 may generate state update information STUP corresponding to the generated memory command. When the state update information STUP includes a first setting value, the state register SRG may not be updated after the corresponding memory command is performed. When the state update information STUP includes a second setting value, the state register SRG may be updated after the corresponding memory command is performed. Hereinafter, for convenience, the first setting value is exemplified as a logical value "0", and the second setting value is exemplified as a logical value "1".

The memory command generating unit 120 may queue the generated memory command and the state update information STUP in the memory command queue MCQ. In an exemplary embodiment, the memory command generating unit 120 may queue the generated memory command, a task ID of one of the host commands HCMD1 to HCMDm corresponding to the memory command, and state update information STUP in the memory command queue MCQ as a single memory command set MCS. The memory command queue MCQ may input/output data according to the first-in-first-out basis.

In FIG. 1, the first to fifth memory command sets MCS1 to MCS5 may be queued between a head address HD and a tail address TL of the memory command queue MCQ. It is assumed that the first memory command MCMD1 corresponds to the first host command HCMD1. In the first host command set HCS1, the first host command HCMD1 has the first task ID TKID1. For example, the first memory command MCMD1 may be queued together with the first task ID TKID1 and the state update information STUP of the logical value "1".

It is assumed that the second to fourth memory commands MCMD2 to MCMD4 correspond to the second host command HCMD2. That is, in order to perform the second host command HCMD2, the second to fourth memory command MCMD2 to MCMD4 may be generated. In the second host command set HCS2, the second host command HCMD2 has the second task ID TKID2. Each of the second to fourth memory commands MCMD2 to MCMD4 may be queued together with the second task ID TKID2 and the state update information STUP. For example, the state update information STUP corresponding to the memory command MCMD4 queued at the last time among the second to fourth memory commands MCMD2 to MCMD4 may have a logical value "1". For example, the state update information STUP corresponding to the remaining memory commands MCMD2 and MCMD3 among the is second to fourth memory commands MCMD2 to MCMD4 may have a logical value "0".

It is assumed that a fifth memory command MCMD5 corresponds to a third host command HCMD3. For example, the fifth memory command MCMD5 may be queued together with the third task ID TKID3 and the state update information STUP of the logical value "1".

As described above, the memory command sets MCS1 to MCS5 for the first to $m^{th}$ host command sets HCS1 to HCSm may be generated, and the memory command sets may be queued in the memory command queue MCQ.

The memory command performing unit 130 may perform the memory commands stored in the memory command queue MCQ. The first to fifth memory command sets MCS1 to MCS5 within the memory command queue MCQ may be sequentially output. The memory command performing unit 130 may provide each memory command to the semiconductor memory device 200, and may receive a response to the memory command. When the memory command is a memory read command for a page within the semiconductor memory device 200, the semiconductor memory device 200 may output data stored in the selected page as a response. In this case, the memory command performing unit 130 may update the data received from the semiconductor memory device 200 in the map table MPT as mapping information.

According to an exemplary embodiment of the present invention, is the memory command performing unit 130 may perform the memory command output from the memory command queue MCQ, and then may refer to the state update information STUP corresponding to the memory command, an operation for which is completed. The state update information STUP of the memory command set including the performed memory command may be referred to. The memory command performing unit 130 may update one of the ready set bits RSB1 to RSBm corresponding to the memory command, an operation for which is completed, according to the referred state update information STUP. More particularly, a single memory command set may be output, and an operation may be performed by the semiconductor memory device 200 in response to the memory command included in the outputted memory command set. When the state update information STUP included in the outputted memory command set is a logical value "1", the memory command performing unit 130 may update the ready set bit of the task ID, which is included in the outputted memory command set, in the state register SRG.

For example, the first memory command set MCS1 may be output from the memory command queue MCQ. An operation may be performed by the semiconductor memory device 200 in response to the first memory command MCMD1. When the operation in response to the first memory command MCMD1 is completed, the memory command performing unit 130 may update the first ready set bit RSB1 corresponding to the first task ID TKID1 by referring to the state update information STUP having the logical value "1" in the first memory command set MCS1. For example, the memory command performing unit 130 may update the state register SRG, so that the first ready set bit RSB1 has a logical value "1".

Then, the second memory command set MCS2 may be output from the memory command queue MCQ. An operation may be performed by the semiconductor memory device 200 in response to the second memory command MCMD2. The state update information STUP of the second memory command set MCS2 has a logical value "0". The memory command performing unit 130 may not update the state register SRG. The third memory command set MCS3 may be output from the memory command queue MCQ. After an operation is completed by the semiconductor memory device 200 in response to the third memory command MCMD3, the state register SRG may not be updated according to the state update information STUP having the logical value "0" in the third memory command set MCS3. The fourth memory command set MCS3 may be output from the memory command queue MCQ. An operation may be performed by the semiconductor memory device 200 in response to the fourth memory command MCMD4. The fourth memory command set MCS4 may include the state update information STUP having a logical value "1". The fourth memory command set MCS4 may include the second task ID TKID2. The memory command performing unit 130 may update the state register SRG based on the state update information STUP having a logical value "1" in the fourth memory command set MCS4 so that the second ready set bit RSB2 corresponding to the second task ID TKID2 has a logical value "1". As a result, after completion of operations in response to all of the memory commands MCMD2 to MCMD4 for the second host command HCMD2, the corresponding ready set bit RSB2 may be updated.

In an exemplary embodiment, the memory command queue MCQ may be provided as a single hardware module, which is independent from the memory command generating unit 120.

For comparison with an exemplary embodiment of the present invention, it is assumed that the memory command generating unit 120 updates the ready set bits RSB1 to RSBm of the state register SRG. After an operation is completed by the semiconductor memory device 200 in response to the memory command, the memory command performing unit 130 may generate, for example, an interrupt signal, and notify the memory command generating unit 120 of the completion of the operation corresponding to the memory command. The memory command generating unit 120 may stop an ongoing operation, which has already started to perform, in response to the interrupt signal, determine a corresponding ready set bit, and update the determined ready set bit. The repeated generation of the interrupt signal may decrease the speed of the memory command generating unit 120.

According to an exemplary embodiment, after the memory command is generated by the memory command generating unit 120, the corresponding ready set bit of the state register SRG may be updated without intervention of the memory command generating unit 120. To this end, the memory command generating unit 120 may queue the state update information STUP together with the memory command in the memory command queue MCQ. The memory command performing unit 130 may update the corresponding ready set bit of the state register SRG based on the corresponding state update information STUP after an operation is completed by the semiconductor memory device 200 in response to the memory command. Accordingly, operation speeds of the memory command generating unit 120 and the memory controller 100 may be improved.

Figure 2:
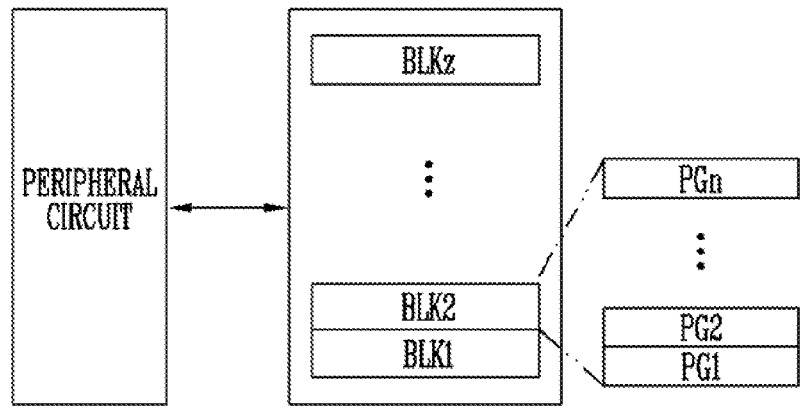
FIG. 2 is a block diagram illustrating a semiconductor memory device of FIG. 1.

FIG. 2 is a block diagram illustrating a semiconductor memory device 200 of FIG. 1.

Referring to FIG. 2, the semiconductor memory device 200 may include a memory cell array 210 and a peripheral circuit 210 for driving the memory cell array 220. The semiconductor memory device 200 may perform operations under control of the memory controller 100. The memory cell array 210 may include first to $z^{th}$ memory blocks BLK1 to BLKz. Each of the first to $z^{th}$ memory blocks BLK1 to BLKz may include first to $n^{th}$ pages PG1 to PGn. Each of the first to $n^{th}$ pages PG1 to PGn may include a plurality of memory cells.

The peripheral circuit 220 may control the memory cell array 210. The peripheral circuit 220 may perform operations under control of the memory controller 100. The peripheral circuit 220 may program data in the memory cell array 210, read data from the memory cell array 210, or erase data of the memory cell array 210 in response to the memory command from the memory controller 100.

In an exemplary embodiment, read and program operations of the semiconductor memory device 200 may be performed by in units of pages. During the program operation, the peripheral circuit 220 may receive a memory command, a physical block address, and data from the memory controller 100. One memory block and one page included in the one memory block may be selected by the physical block address. The peripheral circuit 220 may program the data in the selected page. During the read operation, the peripheral circuit 220 may receive a memory command and a physical block address from the memory controller 100. One memory block and one page included in the one memory block may be selected by the physical block address. The peripheral circuit 220 may read data from the selected page, and output the read data to the memory controller 100.

In an exemplary embodiment, the semiconductor memory device 200 may be a flash memory device.

Figure 3:
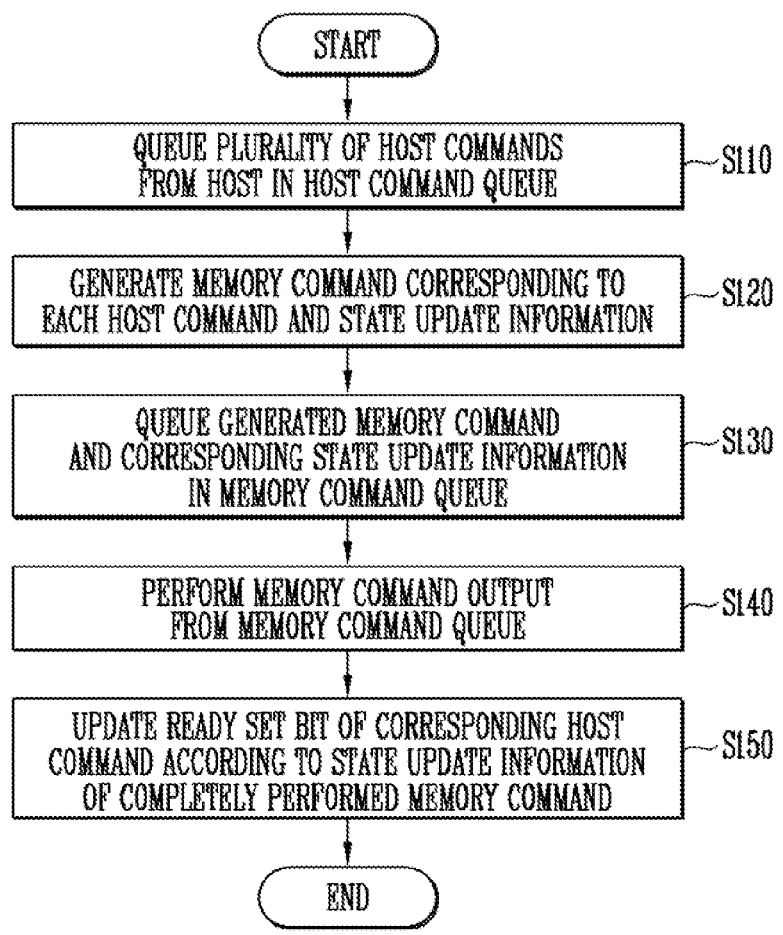
FIG. 3 is a flowchart illustrating a method of operating the memory controller according to an exemplary embodiment of the present invention.
Figure 4:
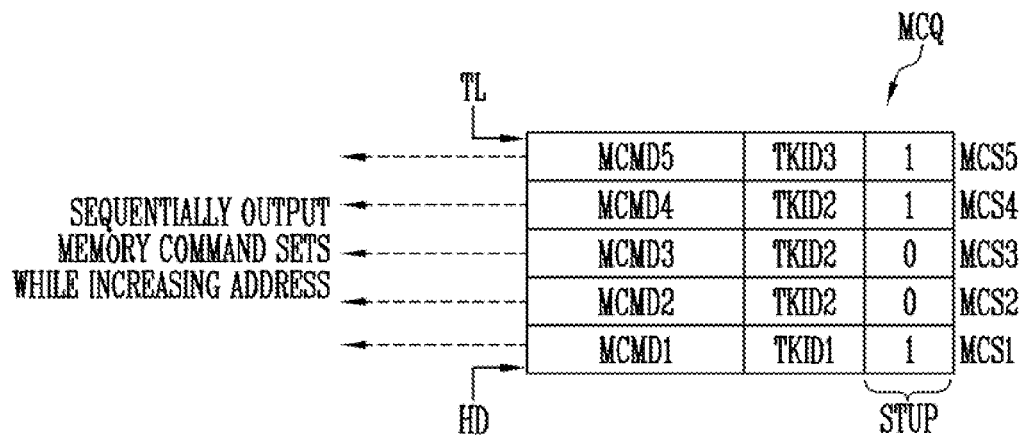
FIG. 4 is a diagram for illustrating a process of outputting a memory command from a memory command queue.

FIG. 3 is a flowchart illustrating an operating method of the memory controller 100 according to an exemplary embodiment of the present invention. FIG. 4 is a diagram illustrating a process of outputting a memory command from the memory command queue MCQ.

Referring to FIGS. 1 and 3, at step S110, the plurality of host commands HCMD1 to HCMDm from the host Host may be queued in the host command que HCQ. In an exemplary embodiment, test IDs respectively corresponding to the queued host commands may also be queued in the host command que HCQ. The queued host command and the corresponding test IDs may form host command sets HCS, respectively.

Then, a preparation operation may be performed on each of the plurality of host commands HCMD1 to HCMDm.

At step S120, a memory command state update information STUP corresponding each host command may be generated. The state update information STUP may indicate whether to update the state register SRG after the operation in response to the memory command being completed. The memory command generating unit 120 may generate one or more memory commands for operation of each host command of the host command queue HCQ. For example, when a logical block address corresponding to inputted together with a host command is not in the map table MPT, the memory command generating unit 120 may generate one or more memory commands for obtaining mapping information about the logical block address from the semiconductor memory device 200. In this case, the memory command may be a memory read command.

When the memory command is generated, the memory command generating unit 120 may generate state update information STUP corresponding to the memory command.

At step S130, the generated memory command and the corresponding state update information STUP may be queued in the memory command queue MCQ. In FIG. 1, the first to fifth memory commands MCMD1 to MCMD5 and the state update information STUP respectively corresponding to the first to fifth memory commands MCMD1 to MCMD5 may be sequentially queued in the memory command queue MCQ. For example, the first memory command MCMD1 may have the state update information STUP having a logical value "1", the second and third memory commands MCMD2 and MCMD3 may have the state update information STUP having a logical value "0", and the fourth and fifth memory commands MCMD4 and MCMD5 may have the state update information STUP having a logical value "1".

Although not illustrated in FIG. 1, the memory commands corresponding to the remaining host commands HCMD4 to HCMDm may also be queued n the memory command que MCQ.

In an exemplary embodiment, the task IDs respectively corresponding to the queued host commands of the host command queue HCQ and therefore respectively corresponding to the queued memory commands of the memory command queue MCQ may be queued in the memory command queue MCQ. The queued memory command, the corresponding state update information STUP, and the corresponding test. IDs may form memory command sets MCS, respectively.

For example, the first memory command MCMD1 may correspond to the first host command HCMD1. The first memory command set MCS1 may include the first memory command MCMD1, the first task ID TKID1, and the state update information STUP having the logical value "1". The second to fourth memory commands MCMD2 to MCMD4 may correspond to the second host command HCMD2. The second host command HCMD2 may have the second task ID TKID2. The second memory command MCMD2, the second task ID TKID2, and the state update information STUP having the logical value "0" may be queued as the second memory command set MCS2. The third memory command MCMD3 the second task ID TKID2, and the state update information STUP having the logical value "0" may be queued as the third memory command set MCS3. The fourth memory command MCMD4, the second task ID TKID2, and the state update information STUP having the logical value "1" may be queued as the fourth memory command set MCS4. The fifth memory command MCMD5 may correspond to the third host command HCMD3. The fifth memory command MCMD5, the third task ID TKID3, and the state update information STUP having the logical value "1" may be queued as the fifth memory command set MCS5.

After step S130, the state register SRG may be selectively updated according to the value of the corresponding state update information STUP of the memory queue MCQ whenever one or more operations in response to the queued memory command are completed, without intervention of the memory command generating unit 120.

At step S140, operations in response to the memory command output from the memory command queue MCQ may be performed. The memory command performing unit 130 may sequentially perform operations according to the memory commands included in the first to fifth memory commands MCS1 to MCS5 of the memory command queue MCQ on first-in-first-out basis.

FIG. 4 is a diagram for illustrating a process of outputting the memory command from the memory command queue MCQ. Referring to FIG. 4, the memory command performing unit 130 may sequentially perform operations according to the memory commands included in the first to fifth memory command sets MCS1 to MCS5 stored between the head address HD and the address TL of the memory command queue MCQ. The memory command performing unit 130 may obtain the head address HD and the tail address TL from the memory command generating unit 120, and sequentially perform operations according to the memory commands included in the first to fifth memory commands MCS1 to MCS5 of the memory command queue MCQ on first-in-first-out basis.

Referring back to FIG. 3, at step S150, a ready set bit of the corresponding host command may be updated according to the state update information STUP corresponding to the memory command, in response to which one or more operations are completed.

When the state update information corresponding to the completed memory command has a logical value "1", the ready set bit of the corresponding host command may be updated. When the state update information corresponding to the completed memory command has a logical value "0", the ready set bit of the corresponding host command may not be updated.

In an exemplary embodiment, the first to $m^{th}$ ready set bits RSB1 to RSBm corresponding to the task ID included in respective memory command sets MCS of the memory command set MCQ may be updated according to the corresponding state update information STUP. For example, when operations in response to the first memory command MCMD1 of the first memory command set MCS1, which includes the first memory command MCMD1, the corresponding state update information STUP, and the first task ID TKID1, is completed, the first ready set bit RSB1 corresponding to the first task ID TKID1 may be updated to a logical value "1" according to the corresponding state update information STUP having a value of "1". When operations corresponding to the second and third memory command sets MCS2 and MCS3 are completed, the second ready set bit RSB2 corresponding to the second task ID TKID2 may be maintained with a logical value "0" according to the state update information STUP having a logical value "0" in the second and third memory command sets MCS2 and MCS 3. When an operation corresponding to the fourth memory command set MCS4 is completed, the second ready set bit RSB2 corresponding to the second task ID TKID2 may be updated to a logical value "1" according to the state update information STUP having a logical value "1" in the fourth memory command set MCS4. That is, the second ready set bit RSB2 may be updated to a logical value "1" when the second host command HCMD2 corresponding to the second ready set bit RSB2 is ready and available. When an operation corresponding to the fifth memory command set MCS5 is completed, the third ready set bit RSB3 corresponding to the third task ID TKID3 may be updated to a logical value "1" according to the state update information STUP having a logical value "1" in the fifth memory command set MCS5.

According to the exemplary embodiment of the present invention, the state update information STUP may be queued in the memory command queue MCQ together with the memory command. Then, the state register SRG may be selectively updated according to the value of the corresponding state update information STUP of the memory queue MCQ whenever one or more operations in response to the queued memory command are completed, without intervention of the memory command generating unit 120. Accordingly, operation speeds of the memory command generating unit 120 and the memory controller 100 may be improved.

Figure 5:
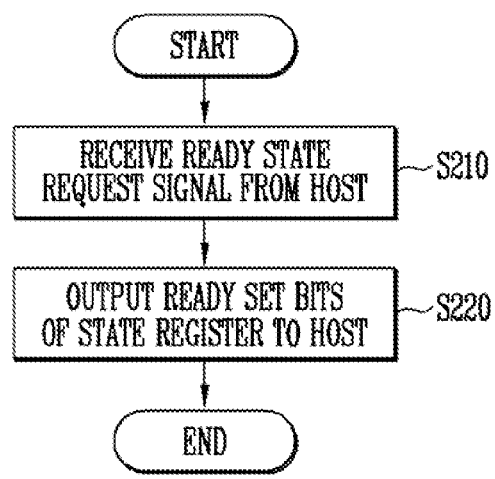
FIG. 5 is a flowchart illustrating a process of outputting ready set bits of a state register of FIG. 1 according to an exemplary embodiment of the present invention.

FIG. 5 is a flowchart illustrating a process of outputting the ready set bits RSB1 to RSBm of the state register SRG shown in FIG. 1 according to an exemplary embodiment of the present invention.

Referring to FIGS. 1 and 5, at step S210, the memory controller 100 may receive a ready state request signal RSR for inquiring the ready set bits RSB1 to RSBm from the host Host. At step S220, the host interface 110 may output the ready set bits RSB1 to RSBm stored in the state register SRG to the host Host.

As described with reference to step S150 of FIG. 3, the first to $m^{th}$ ready set bits RSB1 to RSBm corresponding to the first to $m^{th}$ task IDs TKID1 to TKIDm included in the first to $m^{th}$ memory command sets MCS1 to MCSm of the memory command set MCQ may be updated according to the corresponding state update information STUP. Also as described with reference to FIG. 1, the first to $m^{th}$ host commands HCMD1 to HCMDm may correspond to the first to $m^{th}$ task IDs, respectively. Therefore, the first to $m^{th}$ host commands HCMD1 to HCMDm, the first to $m^{th}$ memory commands MCMD1 to MCMDm, the status update information STUP, and the first to $m^{th}$ ready set bits RSB1 to RSBm may correspond to one another through the first to $m^{th}$ task IDs TKID1 to TKIDm, respectively. Through the first to $m^{th}$ ready set bits RSB1 to RSBm transmitted from the host interface 110 at step S220, the host Host may determine which one of the first to $m^{th}$ host commands HCMD1 to HCMDm is ready and available.

The host Host may output the execution command for the host commands selected from the first to m host commands HCMD1 to HCMDm according to the first to $m^{th}$ ready set bits RSB1 to RSBm received at step S220. In an exemplary embodiment, the execution command may include information for identifying the first to $m^{th}$ task IDs TKID1 to TKIDm corresponding to one or more of the ready and available first to $m^{th}$ host commands HCMD1 to HCMDm, and the first to $m^{th}$ task IDs TKID1 to TKIDm may be selected according to logical values of the information.

Figure 6:
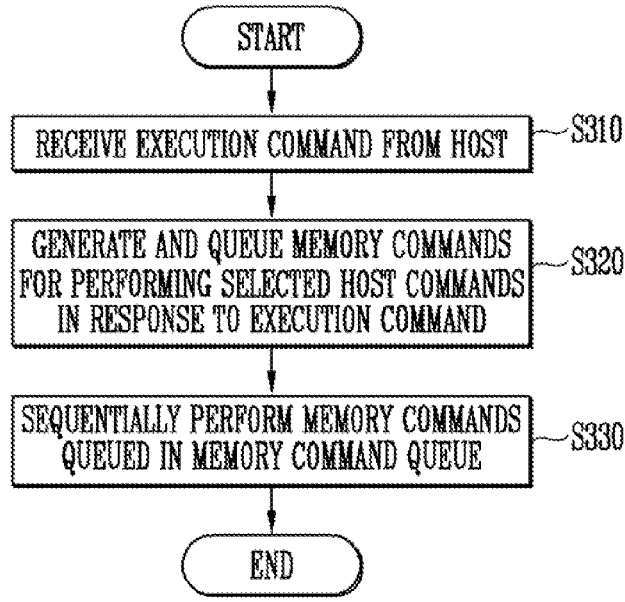
FIG. 6 is a flowchart illustrating a method of operating a memory controller in response to an execution command from a host according to an exemplary embodiment of the present invention.

FIG. 6 is a flowchart illustrating a method of operating the memory controller 100 in response to the execution command from the host Host according to an exemplary embodiment of the present invention.

Referring to FIGS. 1 and 6, at step S310, the memory controller 100 may receive the execution command from the host Host. The execution command may include the information for identifying the first to $m^{th}$ task IDs TKID1 to TKIDm corresponding to one or more of the ready and available first to $m^{th}$ host commands HCMD1 to HCMDm. Through the execution command, one or more ready and available host command may be selected from the first to $m^{th}$ host commands HCMD1 to HCMDm.

At step S320, the memory command generating unit 120 may generate memory commands corresponding the selected host commands in response to the execution command, and may queue the generated memory commands in the memory command queue MCQ.

The memory command generating unit 130 may perform a function of a flash translation layer. The memory command generating unit 130 may convert a logical block address of each host command into a physical block address by referring to the map table MPT. When the memory command is stored in the memory command queue MCQ, the memory command generating unit 130 may store the corresponding physical block address in the RAM 140 in relation to the memory is command.

At step S330, the memory command performing unit 130 may sequentially perform operations according to the memory commands included in the memory commands of the memory command queue MCQ on the first-in-first-out basis. The memory command performing unit 130 may transmit each memory command to the semiconductor memory device 200 together with the physical block address stored in the RAM 140 in relation to the memory command. When the memory command is a memory read command, the data stored in the semiconductor memory device 200 may be received. When the memory command is a memory program command, the memory command performing unit 130 may transmit data to be programmed to the semiconductor memory device 200.

Figure 7:
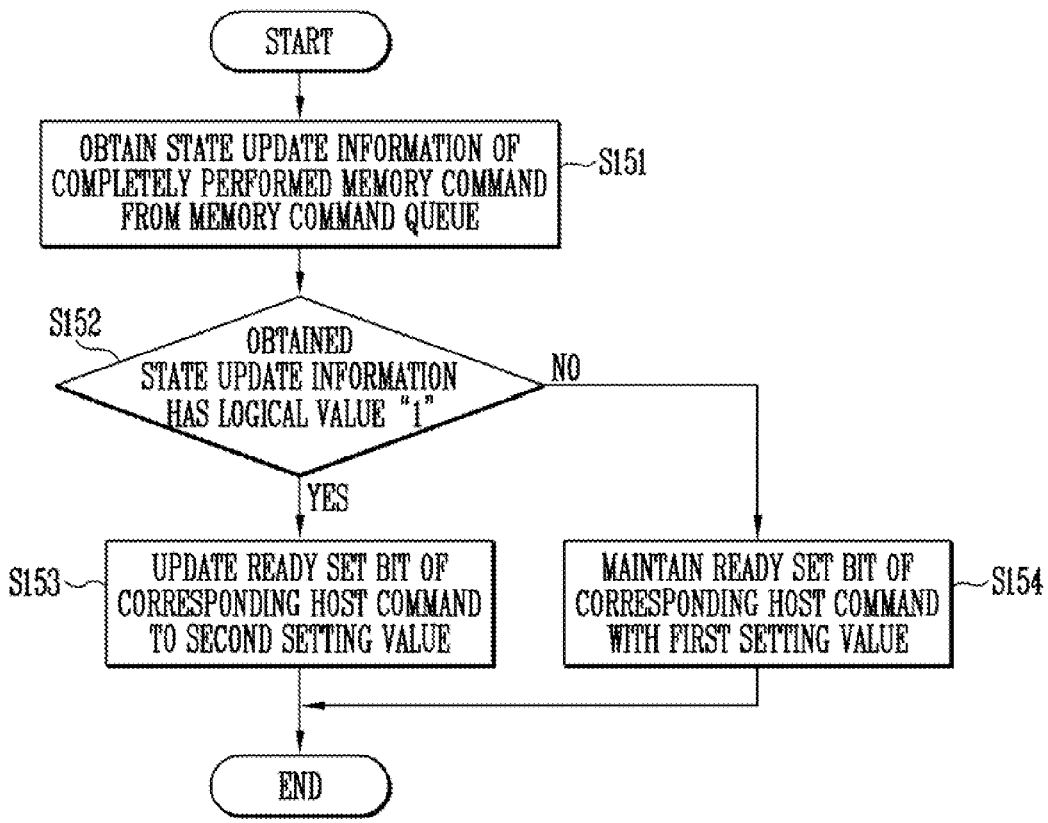
FIG. 7 is a flowchart illustrating step S150 of FIGS. 3.

FIG. 7 is a flowchart illustrating step S150 of FIG. 3. As described with reference to step S150 of FIG. 3, the first to $m^{th}$ ready set bits RSB1 to RSBm corresponding to the first to $m^{th}$ task IDs TKID1 to TKIDm included in the first to $m^{th}$ memory command sets MCS1 to MCSm of the memory command set MCQ may be updated according to the corresponding state update information STUP. Also as described above, the first to $m^{th}$ host commands HCMD1 to HCMDm, the first to $m^{th}$ memory commands MCMD1 to MCMDm, the status update information STUP, and the first to $m^{th}$ ready set bits RSB1 to RSBm may correspond to one another through the first to $m^{th}$ task IDs TKID1 to TKIDm, respectively.

Referring to FIGS. 1 and 7, at step S151, the memory command performing unit 130 may obtain the state update information STUP corresponding to the memory command, in response to which one or more operations are completed, from the i memory command queue MCQ. For example, when operations in response to the first memory command MCMD1 of the first memory command set MCS1, which includes the first memory command MCMD1, the corresponding state update information STUP, and the first task ID TKID1, is completed, the corresponding state update information STUP having a logical value "1" may be obtained. When operations in response to the second memory command MCMD2 of the second memory command set MCS2, which includes the second memory command MCMD2, the corresponding state update information STUP, and the second task ID TKID2, is completed, the corresponding state update information STUP having a logical value "0" may be obtained.

At step S152, the memory command performing unit 130 may determine whether the obtained state update information STUP has a logical value "1". When the obtained state update information STUP has a logic value "1" ("YES" at step S152), the memory command performing unit 130 may update the ready set bit of the corresponding host command to a second setting value, for example, a logical value "1", at step S153. For example, after the operations in response to the first memory command MCMD1 of the first memory command and set MCS1 is completed, the first ready set bit RSB1 may be updated to the second setting value according to the state update information STUP, which corresponds to the first memory command MCMD1 and has a logical value "1". When the obtained state update information STUP has a logic value "0" ("NO" at step S152), the memory command performing unit 130 may update the ready set bit of the corresponding host command to a second setting value, for example, a logical value "1", at step S154. After the operations in response to the second memory command MCMD2 of the second memory command set MCS2 is completed, the second ready set bit RSB2 may be maintained with the first setting value according to the state update information STUP, which corresponds to the second memory command MCMD2 and has a logical value "0".

Figure 8:
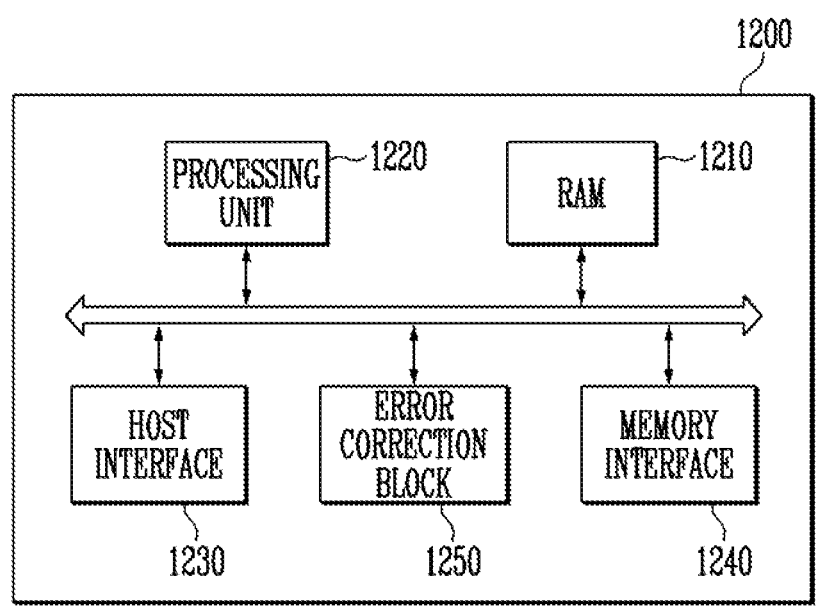
FIG. 8 is a block diagram illustrating an exemplary embodiment for implementing a memory controller of FIG. 1.

FIG. 8 is a block diagram illustrating an exemplary embodiment 1200 for implementing the memory controller 100 of FIG. 1.

Referring to FIG. 8, a controller 1200 may include a Random Access Memory (RAM) 1210, a processing unit 1220, a host interface 1230, a memory interface 1240, and an error correction block 1250.

The processing unit 1220 may control general operations of the controller 1200. The RAM 1210 may be used as one or more among an operation memory of the processing unit 1220, a cache memory between the semiconductor memory device 200 of FIG. 1 and the host Host of FIG. 1, and a buffer memory between the semiconductor memory device 100 and the host Host. The processing unit 1220 and the RAM 1210 may perform the function of the memory command generating unit 120 of FIG. 1. For example, the processing unit 1220 may perform the function of the memory command generating unit 120 by loading a program command, a data file, a data structure, and the like to the RAM 1210, and executing the loaded data.

In addition, the RAM 1210 may be used as the RAM 140 of FIG. 1. FIG. 8 illustrates that one. RAM 1210 is provided, but two or more RAMS may be provided.

The host interface 1230 may include a protocol for performing data exchange between the host and the controller 1200. The host interface 1230 may perform the function of the host interface 110 of 1.

The memory interface 1240 interfaces with the semiconductor memory device 200. The error correction block 1250 may correct an error of data read from the semiconductor memory device 200 by using an error correction code. The memory interface 1240 and the error correction block 1250 may perform the function of the memory command performing unit 130 of FIG. 1.

According to an exemplary embodiment of the present invention, the state update information STUP may be queued in the memory command queue MCQ together with the memory command MCMD. Then, the ready set bit RSB of the state register SRG may be selectively updated according to the corresponding state update information STUP without intervention of the memory command generating unit whenever operations for each memory command are completed. Accordingly, operation speeds of the memory command generating unit and the memory controller are improved.

As described above, embodiments have been disclosed in the drawings and the specification. The specific terms used herein are for illustration, and do not limit the scope of the present invention as defined in the claims. Accordingly, those skilled in the art will appreciate that various modifications and another examples may be made without departing from the scope and spirit of the present disclosure. Therefore, the scope of the present invention will be defined by the technical spirit of the accompanying claims.

What is claimed is:

1. A memory controller, comprising:
a host command queue;
a host interface queuing a plurality of host commands from a host in the host command queue;
a state register storing ready set bits respectively corresponding to the plurality of host commands, wherein each of the ready set bits indicates whether corresponding one of the plurality of host commands is ready and available;
a memory command queue;
a memory command generating unit generating and queuing memory commands and state update information in the memory command queue; and
a memory command performing unit performing an operation in response to the queued memory commands,
wherein the memory command performing unit obtains state update information corresponding to a performed memory command from the memory command queue, and updates a ready set bit of a host command corresponding to the performed memory command based on the obtained state update information,
wherein the host interface further receives a plurality of task IDs respectively corresponding to the plurality of host commands from the host,
wherein the ready set bits correspond to the task IDs, respectively,
wherein the memory command generating unit further queues the task IDs together with the memory commands corresponding to the queued host commands in the memory command queue, respectively, and
wherein the memory command performing unit detects a task ID corresponding to the performed memory command from the memory command queue, and updates a ready set bit corresponding to the detected task ID within the state register according to the obtained state update information.

2. The memory controller of claim 1, wherein the host interface outputs the ready set bits to the host in response to a ready state request from the host.

3. The memory controller of claim 2, wherein the memory controller receives execution commands for some of the host commands, which are selected by the host.

4. The memory controller of claim 3, wherein the memory command generating unit generates a plurality of memory commands for performing the selected host commands in response to the execution command, and queues the plurality of generated memory commands in the memory command queue.

5. The memory controller of claim 4, wherein the memory command performing unit performs an operation in response to the queued memory commands.

6. The memory controller of claim 1, wherein the host interface further queues the plurality of host commands together with the corresponding task IDs in the host command queue.

7. A method of operating a memory controller, comprising:
- receiving a plurality of host commands and a plurality of task IDs respectively corresponding to the plurality of host commands from a host;
- queuing the plurality of host commands from the host in a host command queue;
- providing ready set bits corresponding to the plurality of host commands, respectively, to a state register;
- generating and queuing memory commands and state update information in the memory command queue;
- performing an operation in response to the queued memory commands;
- updating a ready set bit of a host command corresponding to a performed memory command according to state update information corresponding to the performed memory command,
- outputting the ready set bits to the host in response to a ready state request from the host,
- wherein the ready set bits correspond to the task IDs, respectively,
- wherein the queuing of the state update information includes queuing the task IDs together with the memory command corresponding to the queued host commands in the memory command queue, respectively, and
- wherein the updating of the ready set bit includes:
  - detecting a task ID corresponding to the performed memory command from the memory command queue; and
  - updating a ready set bit corresponding to the detected task ID within the state register according to the state update information corresponding to the performed memory command.

8. The method of claim 7, wherein each of the ready set bits indicates whether a corresponding one of the plurality of host commands is ready and available.

9. The method of claim 7, further comprising receiving an execution command for some of the host commands, which are selected by the host.

10. The method of claim 9, further comprising generating and queuing memory commands and state update information corresponding to the selected host commands in the memory command queue, respectively, in response to the execution command.

11. The method of claim 7, wherein the queuing of the plurality of host commands includes queuing the plurality of host commands together with the corresponding task ID in the host command queue.

12. A memory controller, comprising:
- a host command queue;
- a host interface queuing a plurality of host commands and task IDs respectively corresponding to the plurality of host commands from a host in the host command queue;
- a state register storing ready set bits respectively corresponding to the task IDs;
- a memory command queue;
- a memory command generating unit generating and queuing memory commands and state update information in the memory command queue; and
- a memory command performing unit performing an operation in response to the queued memory commands,
- wherein the memory command performing unit obtains state update information corresponding to a performed memory command from the memory command queue, and updates a ready set bit of a host command corresponding to the performed memory command based on the obtained state update information,
- the memory command generating unit further queues the task IDs together with the memory commands corresponding to the queued host commands in the memory command queue, respectively, and
- the memory command performing unit detects a task ID corresponding to the performed memory command from the memory command queue, and updates a ready set bit corresponding to the detected task ID within the state register according to the obtained state update information.

* * * * *